United States Patent Office 3,429,465
Patented Feb. 25, 1969

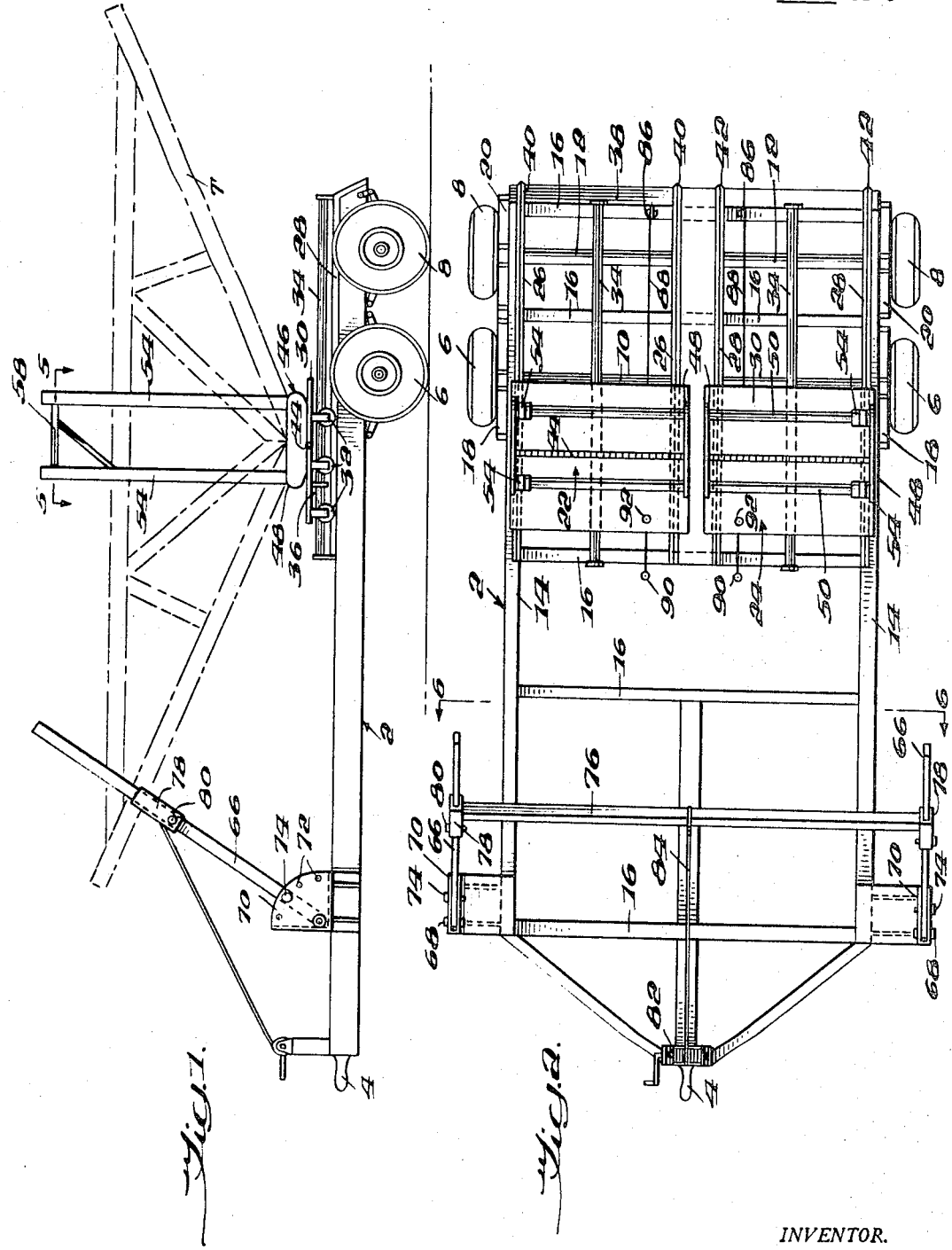

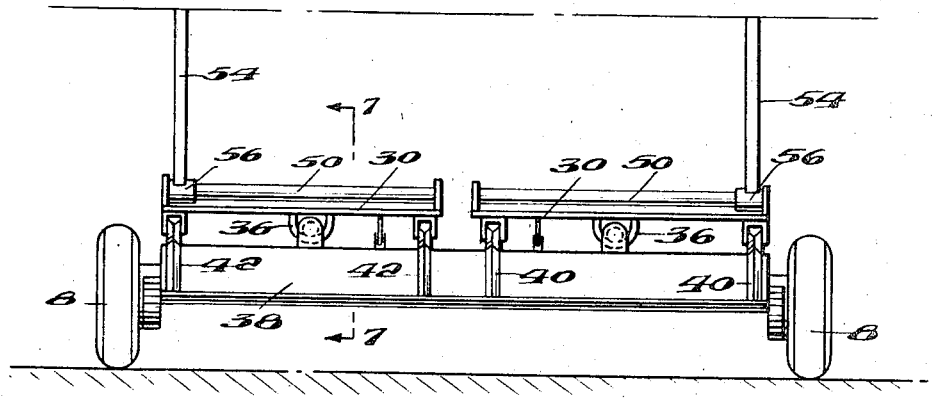
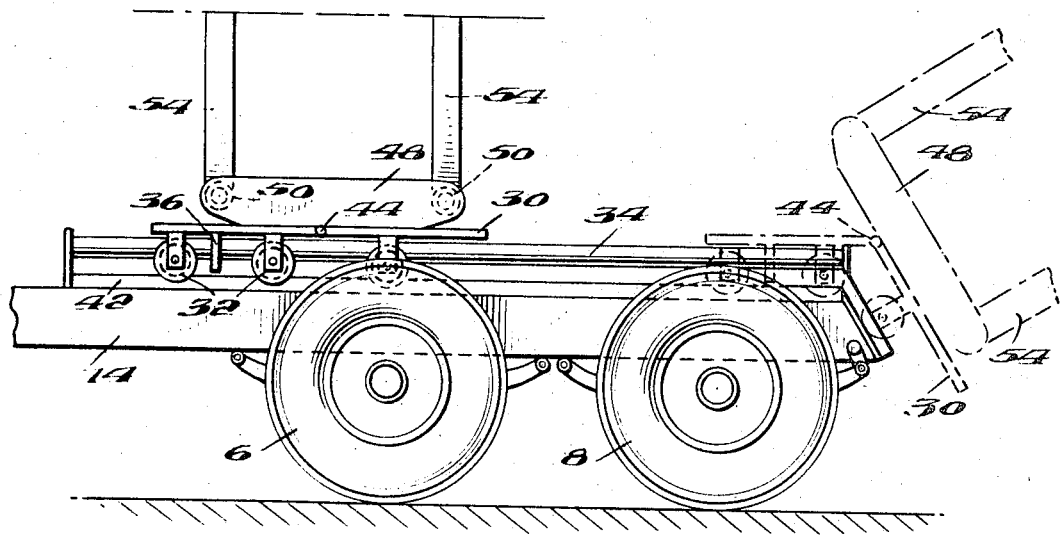
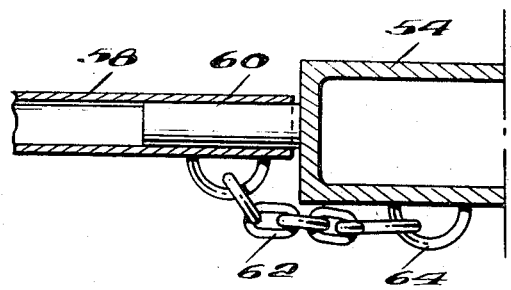

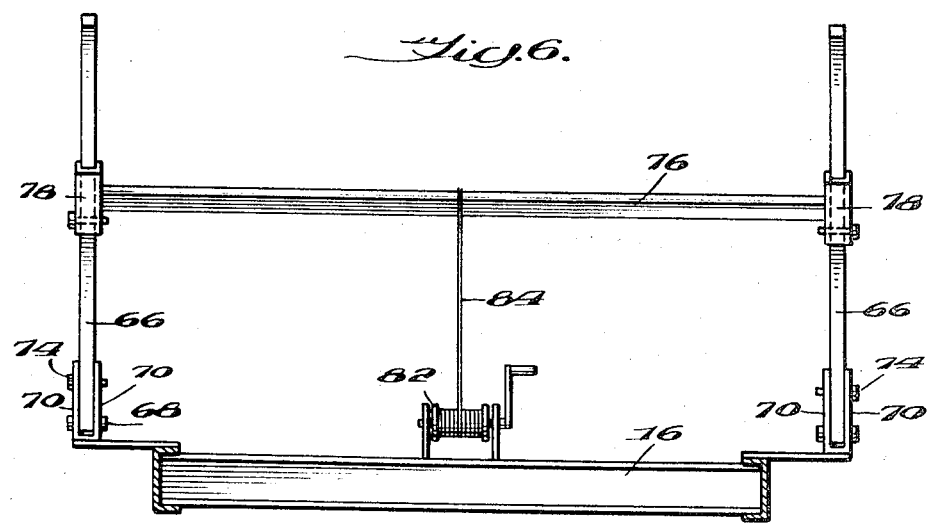
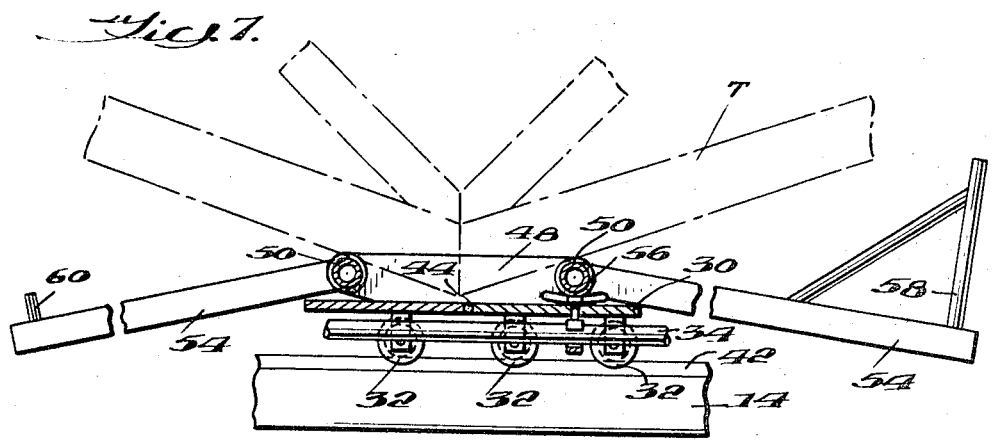
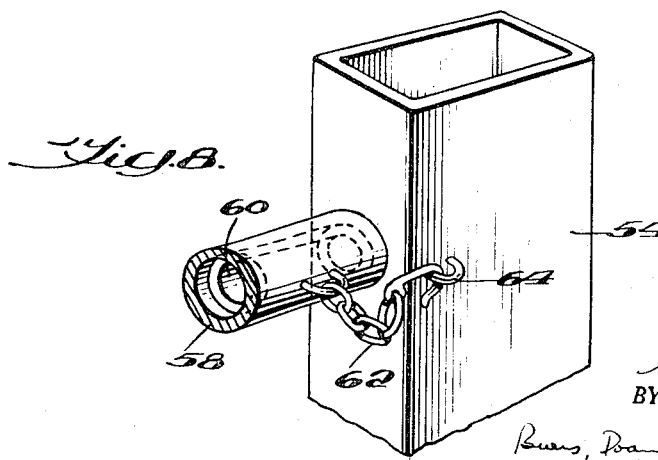

3,429,465
ROOF TRUSS TRAILER
Robert B. Gardner, P.O. Box 496,
Ashland, Va. 23005
Filed Oct. 25, 1966, Ser. No. 589,322
U.S. Cl. 214—83.24                              12 Claims
Int. Cl. B60p 1/14, 1/48

ABSTRACT OF THE DISCLOSURE

A vehicle of the trailer type adapted for hauling roof trusses. A track is mounted on the vehicle and receives thereon a carriage mounted for movement lengthwise of the track, with a rack supported on the carriage capable of movement on the track to an end of the vehicle so as to tilt lengthwise and facilitate discharge of the roof trusses.

---

This invention relates to wheeled vehicles, and more particularly, to apparatus for transporting roof trusses and similar articles.

Roof trusses are commonly used for supporting the the roofs of houses and other buildings. The roof trusses are fabricated in a shop and transported by truck to the job site. The trusses are fabricated in various sizes and shapes and they may be as long as 40 feet and 10 to 12 feet high. One common way of transporting roof trusses is to lay the trusses flat on the bed of a truck, but this is not always satisfactory, since the trusses usually extend over the rear of the truck and constitute a hazard to traffic. Furthermore, the trusses are stressed transversely and they may become weakened. Furthermore, only a few trusses may be transported at a time in this manner, and thus it is an expensive method of transporting trusses.

Apparatus has been proposed for supporting roof trusses on vehicles. One disadvantage of the proposed devices is that they do not eliminate manual loading and unloading of the trusses. Usually, all of the trusses on the vehicle are bound together while in transit and the entire load must be disassembled before any of the trusses are removed from the vehicle. Another disadvantage is that the load is concentrated at the rear of the vehicle. When the vehicle is a trailer with most of the load imposed on the wheels at the rear of the trailer, there is a tendency for the trailer to "fishtail" or sway, as it is being pulled along the highway. This limits the speed at which the trailer can safely travel.

Accordingly it is an object of this invention to provide a vehicle for conveniently transporting and unloading roof trusses.

It is a further object of this invention to provide apparatus for transporting a large number of trusses without imposing transverse stresses on the trusses.

It is a still further object of this invention to provide apparatus for transporting roof trusses on a trailer which is readily adjusted to receive various sizes and shapes of roof trusses and which permits an even distribution of weight between the trailer wheels and the draw bar.

These objects are accomplished in accordance with the preferred embodiment of the invention by a vehicle in the form of a trailer having wheels mounted at the rear of the trailer frame. Tracks on the frame extend longitudinally from approximately the midpoint to the rear of the trailer. A carriage is supported on the tracks by rollers to permit the carriage to move along the tracks. The carriage includes a platform which has a transverse hinge and a rack is rigidly secured to the rear portion of the platform. The rack includes upright posts for supporting roof trusses on the rack. A guide bar extends longitudinally between the tracks for supporting the platform on the tracks. The front portion of the platform has a bracket which passes under the guide bar to hold the carriage on the tracks, but the bracket allows the platform to move along the tracks.

The carriage is movable along the tracks from a point forward of the rear wheels to the rear end of the frame. As the carriage passes over the rear end of the frame, wheels supporting the rear portion of the platform roll down a sloping portion of the tracks, thereby causing the rear portion of the platform to swing downwardly. The rack on which the roof trusses are mounted is rigidly secured to the rear portion of the platform and swings with the platform to lower the rear end of the trusses to a convenient height for unloading.

At the front of the trailer frame, there are upright support posts across which is mounted a horizontal bar for engaging and supporting the front end of the roof truss. The support posts swing vertically to adjust for various sizes and shapes of roof trusses. A winch is mounted at the front of the trailer frame for swinging the posts relative to the frame and for moving the carriages along the tracks. Preferably, the trusses are secured to the trailer frame and the carriage locked to the trailer frame while the trailer is being towed.

The tracks permit the carriage to be located forwardly of the trailer wheels while the loaded trailer is being towed along the highway. Consequently, the load is distributed between the wheels of the trailer and the towing vehicle.

This preferred embodiment is illustrated in the accompanying drawings in which:

FIG. 1 is a side elevational view of a trailer having roof trusses mounted thereon;

FIG. 2 is a top plan view of the trailer;

FIG. 3 is a rear elevational view of the trailer;

FIG. 4 is an enlarged side elevational view of the rear portion of the trailer;

FIG. 5 is a detail cross sectional view of the post latch along the line 5—5 in FIG. 1;

FIG. 6 is a cross sectional view of the trailer along the line 6—6 in FIG. 2;

FIG. 7 is a detail cross sectional view of the trailer along the line 7—7 in FIG. 3; and FIG. 8 is a detail perspective view of the rack post latch.

The roof truss transporting apparatus of this invention is shown in a preferred embodiment as mounted on a trailer having a frame 2 with a conventional trailer hitch 4 at the front end of the frame. The rear of the frame 2 is supported on wheels 6 and 8 arranged in tandem and supported on axles 10 and 12 extending transversely under the frame 2.

The frame includes a pair of side members 14 and a plurality of cross members 16. The axles 10 and 12 are attached to the side members 14 by conventional leaf springs 18 and 20. A pair of carriages 22 and 24 are mounted on the frame for supporting roof trusses T, shown in phantom lines in FIGS. 1 and 7. The carriages are adapted for movement longitudinally of the frame. A pair of tracks 26 extends under the carriage 22 and another pair of tracks 28 extends under the carriage 24. Each carriage includes a platform 30 and a plurality of rollers 32 are mounted on the bottom of the platform 30 in position to engage the tracks 26 and 28, respectively.

The carriages 22 and 24 are secured on their respective tracks 26 and 28 by a guide bar 34 which extends longitudinally of the frame 2 under the platform 30 of each carriage. A strap 36 extends under the bar 34 and is welded or otherwise secured to the bottom of the platform 30. The peripheral surface of the rollers 32 is grooved, as shown in FIG. 3, and cooperates with the inverted V-shaped rails to maintain the carriages on the rails. The clearance between the strap 36 and the bottom of the bar 34 is less than the depth of the groove in the rollers in order to prevent lateral displacement of the rollers 32 off of the tracks 26 and 28.

The carriages may be locked to the guide bar 34 by means of a screw clamp 37 (FIG. 7) on the platform 30. The screw clamp 37 includes a nut welded on the top of the platform and when the head of the screw is turned, a block on the end of the screw engages the guide bar 34 and draws the strap 36 tightly against the bar 34. Thus, the carriage is locked against movement relative to the frame 2. Turning the screw in the opposite direction releases the clamp 37 to permit the carriage to move along the tracks.

At the rear of the frame a transverse plate 38 supports extensions 40 and 42 of the tracks 26 and 28, respectively. The plate 38 slopes downwardly and the track extensions 40 and 42 slope downwardly also, as shown in FIGS. 1 and 4. The platform 30 of each carriage 22 and 24 has a transverse hinge 44 extending across the entire width of the platform. When the platform 30 is moved to its rearwardmost position, the rear rollers 32 drop down on the track extensions 40 or 42, so that the rearward portion of the platform 30 is tilted relative to the forward portion of the platform, as shown in phantom lines in FIG. 4.

Each carriage 22 and 24 includes a rack 46 which is rigidly secured on the rear portion of the platform 30. The rack 46 includes upright sides 48 and a pair of horizontal bars 50 which extend between the sides 48 of each carriage. Swinging posts 54 are mounted on the horizontal bars 50 for receiving roof trusses between the posts 52 and 54 of each carriage. As shown in FIG. 3, each post 54 has a collar 56 secured to the lower end of the post. The collars 56 for each post have an internal diameter that is slightly larger than the external diameter of the bars 50 to allow the collars to slide along the bars and to rotate relative to the bars. Thus, the lateral position of the swinging posts 54 on each carriage may be adjusted by moving the collars 56 along the bars 50.

As shown in FIG. 1, the swinging posts 54 are secured together at the top by an arm 58. The arm 58 is secured to one of the posts 54 and projects outwardly in position to engage a pin 60 which is received in the hollow end of the arm 58. The interconnection of the arm 58 and the pin 60 is shown in detail in FIGS. 5 and 8. A chain 62 has a hook at one end and the opposite end is fastened to the arm 58. The hook on the chain 62 engages in a bracket 64 on the post 54 to hold the arm and the post together. When the hook is disengaged from the bracket 64, the posts 54 are free to swing vertically until they rest on the trailer frame 2. When the posts 54 are spread apart, as shown in FIG. 7, roof trusses may be loaded by a fork lift truck over the side of the carriage.

At the forward end of the frame 2 a structure is provided for supporting the ends of the roof trusses. The structure includes a pair of posts 66 which are mounted on the frame 2 by a pin 68 for vertical swinging movement. A pair of plates 70 are mounted on the frame 2 on opposite sides of each post 66 and a plurality of holes 72 are provided in the plates 70 to receive a lock pin 74 which extends through the holes 72 and through the post 66 for securing the post at a selected angular position relative to the frame 2. A cross bar 76 has a sleeve 78 at each opposite end which slides along the respective posts 66 for adjusting the cross bar 76 relative to the frame 2. A removable pin 80 extends through the sleeve 78 and through the post 66 to secure the ends of the cross bar 76 at the desired position relative to the posts 66. A hand winch 82 is mounted at the front of the frame 2 and a cable 84 is connected with the winch. The end of the cable 84 is attached to the cross bar 76 to facilitate raising and lowering the post 66 relative to the frame 2.

The hand winch 82 may also be used for moving the carriages along the tracks. A pulley 86 is mounted on the transverse member 16 at the rear of the frame between each pair of tracks, as shown in FIGS. 2 and 3. A cable 88 for each carriage has one end secured to the carriage and extends over the pulley and back again to the forward end of the tracks. The free end of each cable 88 has a ring 90 for engagement with the cable 84. Another ring 92 is mounted on each carriage platform (FIG. 2). When the trailer is on a downhill slope, it may be unloaded by attaching the cable 84 to the ring 90 and by operating the winch 82, the appropriate carriage 22 or 24 is displaced along the tracks to the rear of the frame. The carriage may be returned to the forward position by disconnecting the winch cable 84 from the ring 90 and attaching it to the ring 92.

The trailer may be loaded from either side. The cross bar 76 is positioned at approximately the level of the heel joints of the roof trusses that are deposited on the carriages 22 and 24, as shown in FIG. 1. The cross bar 76 may be adjusted vertically by swinging the posts 66 about the pins 68 and locking them at the desired position by inserting the pin 74 into the appropriate holes in the plate 70. The carriages 22 and 24 are positioned at the forward end of their respective tracks 26 and 28, as shown in FIGS. 1 and 2. The swinging posts 54 of each carriage are spread apart by unhooking the chain 62 from the bracket 64 at the top of the posts 54. The posts then swing downwardly and rest on the frame 2, as shown in FIG. 7. The roof trusses may then be transferred by means of a fork lift truck or other means over the side of the trailer frame and deposited on the carriages with the peak joints of the trusses engaging the cross bars 50. If the group of roof trusses on either of the carriages 22 and 24 is less than the width of the carriage, the swinging bars 54 are displaced along the length of the cross bars 50 by sliding the sleeves 56 toward the center of the trailer and then swing the post upwardly, so that the load is centered on the trailer. The swinging posts 54 are latched together by means of the chain 62 and the trusses may be lashed to the carriages 22 and 24 by chains, cables or other suitable means. The ends of the roof trusses engage the cross bar 76 at the front of the trailer and thus the trusses are supported at the heel joint by the cross bar and at the peak joint by the horizontal bars 50 on the carriage. The roof trusses are secured against the cross bar 74 by means of chains or cables that are attached to the frame 2 and extend over the trusses T.

When the roof trusses are to be unloaded from the trailer, the cable or chain securing the forward end of the roof trusses against the cross bar 76 is disconnected from the trusses. The screw clamp 37 is then released and the carriage 22 or 24 is displaced rearwardly until the rear rollers on the platform 30 pass over the rear frame member 16. The winch 82 may be used to move the carriages 22 and 24 along the tracks by attaching the cable 84 to the ring 90 for each carriage. The rollers then move downwardly on the track extension 40 or 42. This movement causes the rack 46 that is secured on the rear portion of the platform to swing downwardly, as shown in FIG. 4. The rack 46 tilts relative to the frame 2 until the rear heel joint of the roof trusses swings downwardly to a point near the ground and the trusses may be easily unloaded either individually or as a group. The strap 36 on the platform engages the brace at the rear end of the guide bar 34 to limit rearward movement of the platform. By lifting up on the rear ends of the trusses, the peak joint is free to pass over the rear cross bar 50 and slide along the top chord until the truss is deposited on the ground. The upright support posts 54 prevent the trusses from falling over while they are being unloaded. After the trusses have been unloaded from the carriage 22, it may be returned to its forward position by attaching the winch cable 84 to the ring 92. The other carriage 24 may be displaced to the rear of the trailer for unloading trusses in the same manner as the carriage 22.

The trailer of this invention permits roof trusses to be transported readily from one location to another. The trusses are carried vertically, so that there is substantially no transverse stressing of the trusses, which might tend to weaken the trusses. The trusses may be easily loaded from the side of the trailer by means of a fork lift truck, and may be loaded either individually or bound together in a bundle. By positioning the carriages forwardly of the rear wheels of the trailer during transit, the load is substantially equally distributed between the draw bar of the hauling vehicle and the rear wheels of the trailer. A good distribution of weight in this manner minimizes "fishtailing" and sidesway of the trailer as it is being pulled along the highway.

Since there are two separate carriages for transporting the trusses, two different loads of roof trusses may be carried and handled separately. For example, the trusses on the carriage 22 may be unloaded at one site without disturbing the bundle of trusses on the other carriage 24. Furthermore, by unloading the roof trusses at the rear of the trailer, in the manner described, the trusses may be conveniently unloaded or deposited on the ground without requiring hoisting equipment or unloading conveyors.

While this invention has been illustrated and described in one embodiment, it is recognized that variations and changes may be made therein without departing from the invention as set forth in the claims.

I claim:
1. In a vehicle having a frame and means supporting one end of the frame, apparatus for transporting roof trusses on said frame comprising:
  (a) track means extending longitudinally of said frame,
  (b) a carriage, means mounting said carriage on said track means for longitudinal movement relative to said track means,
  (c) said carriage including front and rear platform portions, means individually hinging said platform portions on the carriage for individual swinging movement relative thereto,
  (d) a rack on said platform for supporting roof trusses, said rack being rigidly secured to said rear platform portion and movable therewith,
  (e) said track means having a downwardly depending end portion adjacent said frame end, whereby upon movement of said carriage along said depending portion of said track means said rear platform portion swings downwardly about said hinge means relative to said forward portion at the rear of the frame, thereby tilting said rack to facilitate unloading roof trusses from said rack.

2. The apparatus according to claim 1 wherein said carriage mounting means includes a plurality of rollers on said platform portions, said rollers supporting said platform portions in substantially a common plane when said carriage is displaced from said frame end and said rear portion being in sloping relaiton to said front portion when said carriage is at said frame end.

3. In a vehicle having a frame and wheels supporting one end of the frame, apparatus for transporting roof trusses on said frame comprising track means including a pair of rails spaced apart, a guide bar extending longitudinally of said track means, a carriage means mounting said carriage on said track means for longitudinal movement relative to said track means, said carridge having a platform, means hinging said platform transversely of the track means to form front and rear platform portions, and including means for slidably securing said front platform portion to said guide bar, whereby said guide bar maintains said carriage on said track, said mounting means individually supporting said platform portions, a rack on said platform for supporting roof trusses, said rack being rigidly secured to said rear portion, said track means terminating adjacent said frame end, whereby upon movement of said carriage along said track means said rear platform portion swings downwardly relative to said forward portion at the rear of the frame, thereby tilting said rack to facilitate unloading roof trusses from said rack, said carriage mounting means including a plurality of rollers on said platform portions, said rollers supporting said platform portions in substantially a common plane when said carriage is displaced from said frame end and said rear portion being in sloping relation to said front portion when said carriage is at said frame end.

4. The apparatus according to claim 3 wherein said rollers have peripheral groove cooperating with said tract means, said platform securing means and said guide bar having a clearance between them, said clearance being less than the depth of said roller grooves.

5. The apparatus according to claim 3 wherein said platform securing means includes a strap on said platform front portion and extending around said guide bar, and a lock on said platform in position for engaging said guide bar and operable selectively to prevent movement of said platform relative to said guide bar.

6. The apparatus according to claim 1 wherein said rack includes a pair of upright sides secured to said platform rear portion and a pair of bars extending transversely of said platform and between said sides.

7. The apparatus according to claim 3 wherein said rack includes a collar on each of said bars, a post on each bar, said posts each being secured at the lower end of said collar, and means for securing said posts together.

8. The apparatus according to claim 7 wherein said post securing means includes a pin projecting outwardly from one post and an arm on the other post in position to engage said pin, said arm and pin being arranged for fitting together in telescoping relationship, and means for temporarily latching said arm to said one post.

9. The apparatus according to claim 1 including means for displacing said carriage along said tracks.

10. The apparatus according to claim 9 wherein said carriage displacing means includes a winch on said frame forward of said track means, cable means attached to said platform, said cable means being arranged to draw said carriage in a forward and rearward direction selectively by operation of said winch.

11. The apparatus according to claim 3 including support structure on said frame forward of said track means, said support structure having a pair of posts journalled for vertical swinging movement relative to said frame, and a cross bar mounted on said posts, said cross bar being in position for supporting the ends of roof trusses that are deposited on said carriages.

12. The apparatus according to claim 11, including a winch on said frame forward of said posts, said cross bar being movable to a plurality of positions along said posts, said winch being in position for attaching a cable from said winch to said cross bar for raising and lowering said posts.

References Cited

UNITED STATES PATENTS

| | | |
|---|---|---|
| 777,020 | 12/1904 | Hampton. |
| 2,388,304 | 11/1945 | Ackerman et al. __ 280—144 XR |
| 2,808,159 | 10/1957 | Simo _____ 214—516 XR |
| 3,154,207 | 10/1964 | Long _____ 214—501 |

ALBERT J. MAKAY, *Primary Examiner.*

U.S. Cl. X.R.

298—12